United States Patent Office 3,483,630
Patented Dec. 16, 1969

3,483,630
APPARATUS FOR TESTING THE PROFILES
OF GEAR TEETH
William John Davies, Rowland Powell Leyland, and
Albert George Holmes, Derby, England, assignors
to Rolls-Royce Limited, Derby, Derbyshire, England, a British company
Filed Apr. 19, 1967, Ser. No. 632,077
Claims priority, application Great Britain, Aug. 12, 1966, 36,279/66
Int. Cl. G01b 3/14, 5/20
U.S. Cl. 33—179.5                               10 Claims

ABSTRACT OF THE DISCLOSURE

An apparatus for testing the profiles of gear teeth has a feeler which is urged into engagement with the tooth profile and which may be traversed over the latter by rotating the gear about an axis disposed eccentrically thereof. The movement of the feeler during the traverse is indicated.

---

This invention concerns apparatus for testing the profiles of gear teeth and, although the invention is not so restricted, it is more particularly concerned with apparatus for testing the profiles of the gear teeth of Novikov gears.

According to the present invention, there is provided apparatus for testing the profiles of gear teeth comprising a feeler carried by feeler support means, gear support means for mounting a gear to be tested in a position in which a tooth profile thereof may be engaged by the feeler, the gear support means comprising a rotary member with mounting means therein for mounting a gear eccentrically in the rotary member, means for rotating the rotary member to cause the feeler to traverse a predetermined path over the said tooth profile, means for urging the feeler into contact with the said tooth profile during the said traverse; and means for indicating movement of the feeler during the said traverse.

The gear support means preferably comprises a rotary member, there being mounting means therein for mounting the gear eccentrically in the rotary member.

Means are preferably provided for indicating the angular position of the rotary member.

There are also preferably means for locking the rotary member in at least one predetermined angular position.

The mounting means is preferably formed to permit rotation therein of a carrier for the gear, clamping means being provided for clamping the carrier in the mounting means.

Means may be provided for moving the feeler support means to move the feeler towards and away from a tooth of a gear carried by the gear support means, indicator means being provided to indicate the position of the feeler support means.

Thus, the feeler support means may comprise a compound slide whose top slide carries the feeler, the said indicator means indicating the respective positions of the top and bottom slides of the compound slide. Each slide of the compound slide may carry dial gauges carried by the compound slide and having fingers engagable with fixed abutments.

The said means for indicating movement of the feeler during the said traverse may comprise a pen recorder whose pen is connected to the feeler for movement therewith. The pen recorder may comprise a rotatable drum which is connected to the tap slide for movement therewith.

Common means may be provided for effecting simultaneous rotation of the rotary member and of the rotatable drum.

Figure 1:
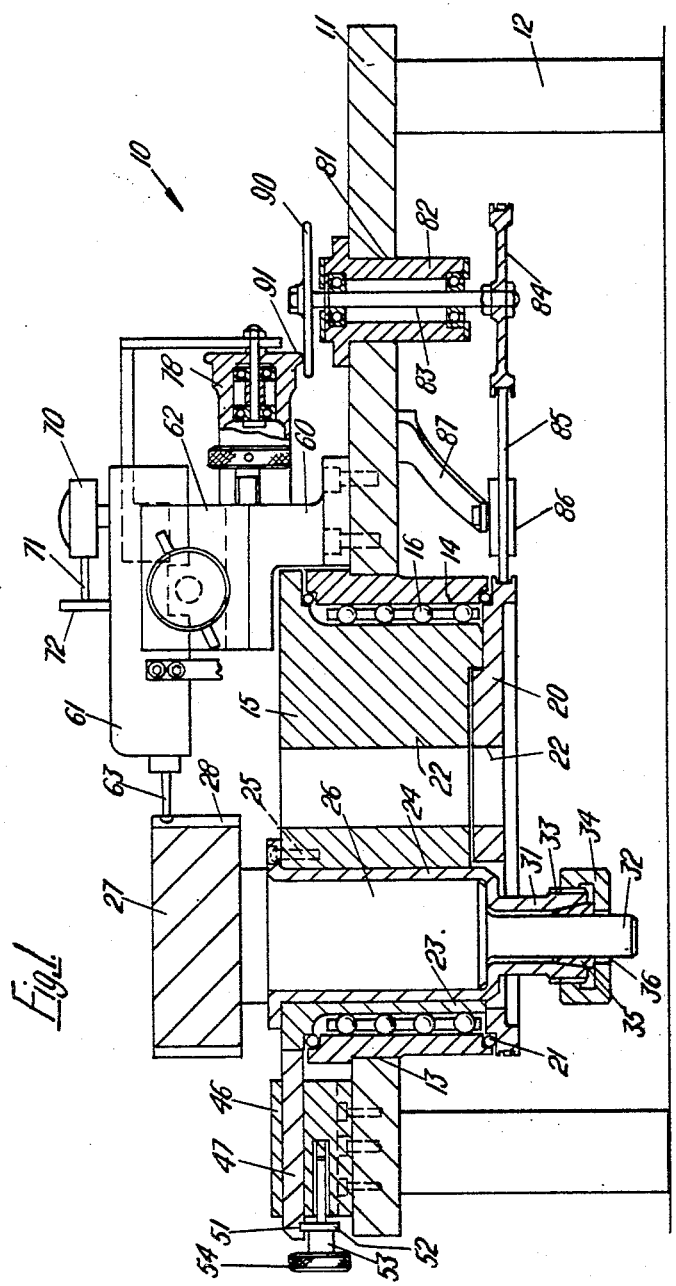
Figure 2:
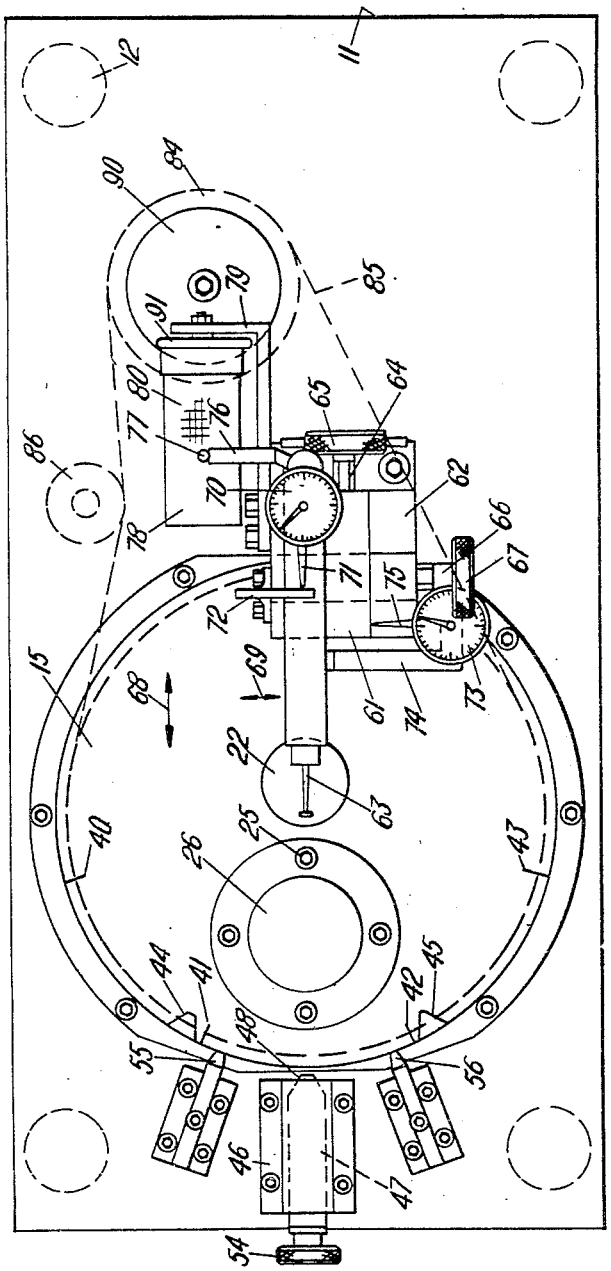
Figure 3:
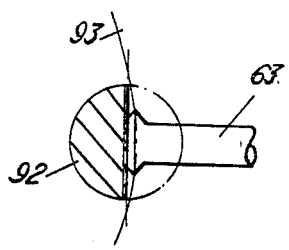
Figure 4:
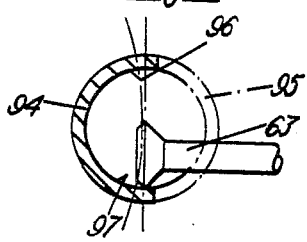
Figure 5:
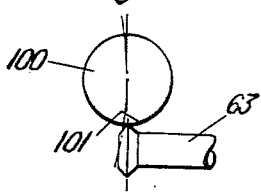

The invention is illustrated, merely by way of example, in the accompanying drawings, in which:

FIGURE 1 is a sectional elevation of an apparatus according to the present invention for testing the profiles of the teeth of a gear, FIGURE 2 is a plan view of the apparatus shown in FIGURE 1, with the said gear removed, and FIGURES 3 to 5 are sketches illustrating the manner in which the apparatus of FIGURES 1 and 2 is initially set up prior to testing the said profiles.

IN FIGURES 1 and 2 there is shown an apparatus 10 for testing the profiles of the teeth of Novikov gears. These gears are characterised by profiles made up of circular arcs.

The apparatus 10 comprises a rectangular table 11 which is suported on four feet 12. The table 11 has a hole 13 therein within which is mounted a sleeve 14 which is secured to the table 11. A rotary cylinder block 15 is rotatably mounted within the sleeve 14 by means of ball bearings 16. The rotary cylinder block 15 is secured by means not shown, to a bottom disc 20, a ball race 21 being provided between the bottom disc 20 and the sleeve 14.

The cylinder block 15 and bottom disc 20 are provided eccentrically with aligned holes 22 therethrough which are disposed to one side of the axis of the cylinder block, the cylinder block 15 also being provided with an eccentric hole 23 therein which is disposed to the opposite side of the axis of the cylinder block.

Mounted in the eccentric hole 23 is a bush 24 which is bolted by means of bolts 25 to the cylinder block 15. A spindle 26 is rotatably mounted in the bush 24. The upper end of the spindle 26 is formed (by means not shown) to be secured firmly to a gear 27 the profiles of whose teeth 28 are to be tested. The holes 22 are provided for the mounting therein of a mating gear (not shown) which meshes with the gear 27 for testing purposes.

The bush 24 has a lower portion 31 which is of reduced diameter, a reduced diameter portion 32 of the spindle 26 extending through the portion 31. The bottom of the portion 31 is threaded, as at 33, to receive a nut 34. A split collet 35 is mounted internally of the portion 41 to be engageable with the portion 32. Thus by tightening and slackening the nut 34, the portion 32 may be clamped and unclamped, so as respectively to fix the angular position of the gear 27 about its own axis, and to free it for rotation about that axis. Such rotation of the gear 27 may be effected by manually rotating the lower end of the portion 32 which extends through a hole 36 in the nut 34.

The cylinder block 15 is provided with marks 40, 41, 42, 43 whose purpose is described below, and with V-shaped notches 44, 45.

Slidably mounted in a block 46 which is secured to the top of the table 11 is a plunger 47 having a V-shaped end portion 48 for cooperation, as required, with one or other of the V-shaped notches 44, 45. The plunger 47 has a recess 51 on its lower surface in which is received a flange 52 of a stud 53 which is threaded into the block 46. The stud 53 is provided with a knurled knob 54 rotation of which moves the plunger 47 into and out of a position in which its end portion 48 may enter one or other of the V-shaped notches 44, 45.

Mounted on opposite sides of the plunger 47 and equi-angularly spaced therefrom are pointers 55, 56 whose purpose is described below.

As will be appreciated, however, the positions of the marks 40–43 with respect to the pointers 55, 56 will indicate certain angular positions of the cylinder block 15, while the plunger 47 and V-shaped notches 44, 45 will enable the cylinder block 15 to be locked in two predetermined angular positions.

Bolted to the top of the table 11 adjacent to the cylinder block 15 is a block 60 which supports a compound slide made up of an upper slide 61 and a lower slide 62. Slidably mounted in the upper slide 61 is a stylus, or other feeler, 63 which is thus supported by the said compound slide and is engageable with the profile of a tooth 28 of the gear 27. A spring (not shown) is provided for urging the stylus 63 outwardly and thus towards engagement with the respective tooth 28 when the parts are as shown in FIGURE 1.

The lower slide 62 is slidably mounted on the block 60 and is movable by a lead screw 64, provided with a knurled hand-wheel 65, in a direction towards and away from the gear 27, as indicated by the doubleheader arrow 68.

The upper slide 61 is slidably mounted on the lower slide 62 and is movable by a lead screw 66 provided with a knurled hand-wheel 67 in directions transverse to the gear 27, as indicated by the doubleheader arrow 69. Thus the stylus 63 may be moved by the hand-wheels 65, 67 to any desired position in the plane in which it lies.

Mounted on the upper slide 61 for movement therewith is a dial gauge 70 having a finger 71 which is engageable with a fixed abutment plate 72 which extends transversely of the gear 27. Thus the reading on the dial gauge 70 indicates the position of the upper slide 61, and hence the stylus 63, with respect to the directions indicated by arrow 68.

The upper slide 61 is also provided with a dial gauge 73 which is connected to the upper slide 61 by a bracket 74. The dial gauge 73 has a finger 75 which engages an abutment plate (not shown) so that the position of the upper slide 61 with respect to the directions indicated by the arrow 69 will be shown. Thus, the dial gauges 70, 73 in effect indicate the respective positions of the slides 61, 62.

The stylus 63 is rigidly connected to an arm 76 which carries a pen 77. The pen 77 forms part of a pen recorder which comprises a rotatable drum 78 which is rotatably carried by a bracket 79 bolted to the upper slide 61. Thus, movement of the stylus 63 will cause the pen 77 to move over and inscribe a chart 80 carried by the rotatable drum 78.

Mounted and secured in a hole 81 in the table 11 is a sleeve 82 in which is rotatably mounted a spindle 83. A pulley 84 is mounted at the lower end of the spindle 83 and engages a belt 85 which is entrained about the bottom disc 20. The belt 85 is tensioned by a tensioner roller 86 which is rotatably mounted on an arm 87 secured beneath the table 11.

The spindle 83 is provided at its upper end with a friction drive 90. Accordingly, if the cylinder block 15 is rotated by hand, whereby to effect eccentric movement of the gear 27, the friction drive wheel 90 will also be rotated.

The rotatable drum 78 has a flange 91 which frictionally engages the friction drive 90. Thus, rotation of the friction drive wheel 90 simultaneously effects rotation of the rotatable drum 78.

When a Novikov gear is tested, the circular arc forming the tooth profile is disposed with its center on the axis of rotation of the cylinder block 15. The stylus 63 is set with its point in contact with the tooth profile and thus to one side (right or left) the axis of rotation of the block 15. The stylus, or a line projected therethrough, passes through the axis of the block 15 so that movement of the stylus is directly related to radial imperfections in the tooth profile. Accordingly, rotation of the cylinder block 15 to effect eccentric movement of the gear 27 will, when the parts are thus arranged, cause the stylus 63 to traverse a predetermined path over the profile of the tooth 28. If, as in the case of Novikov gears, this profile is that of a circular arc, then if the profile is correctly formed, the stylus will not be displaced radially of the tooth profile arc and the pen 77 will not move relatively to the chart 80 during the said traverse and will accordingly inscribe a straight line on the chart 80 during this traverse. However, if the profile is not correctly formed, there will be a kink or other imperfection in the line drawn by the pen 77.

In order to set the stylus 63 relative to the centre of the cylinder block 15, a second gauge 92, FIGURE 3, is mounted (by means not shown) on the spindle 26 and, with the assistance of feelers 93, e.g. having a thickness of 0.015″, the stylus 63 is appropriately positioned. When this has been done the dial gauge 70 is adjusted to read zero.

Where the tooth being tested is a female tooth, e.g. of a wheel, the stylus 63 is iintially set up by the use of a cylindrical setting gauge 94, as shown in FIGURE 4, the setting gauge 94 having a cut-away portion 95 through which the stylus 63 may be introduced. The radius of the bore of the setting gauge 94 is arranged to be the same as the profile radius of the gear 27 to be tested.

The stylus 63 is wound into the setting gauge 94 until the dial gauge 70 reads zero. The stylus 63 is then moved transversely by means of the hand wheel 67 into a position which is determined by whether it is desired to set up the stylus with respect to the left-hand flank 96 or the right-hand flank 97 of the bore of the setting gauge and hence of the gear to which it corresponds. The hand-wheel 67 is rotated until the pen 77 is disposed centrally of the rotatable drum 78. The dial gauge 73 is then set at zero. When this has been done, the upper slide 61 is locked to the lower slide 62 by means of a clamping screw (not shown). The slides 61, 62 then remain locked together throughout the rest of the testing operation.

The stylus 63 is now withdrawn from the setting gauge 94, this being effected by rotating the cylinder block 15 until the stylus 63 "falls out" of the cut-away portion 95 of the setting gauge 94. The setting gauge 94 is now removed from the spindle 26 and is replaced by the gear 27 to be tested. The gear 27 is mounted on the spindle 26 but the latter is initially allowed to be freely rotatable by winding out the nut 34.

If the left-hand profiles of the gear teeth 28 are to be tested (the stylus 63 having been previously set up to test these profiles), the cylinder block 15 is rotated until the V-shaped notch 45 is brought into alignment with the plunger 47. The knurled knob 54 is then rotated to bring the plunger 47 into the V-shaped notch 45 and the stylus 63 is then moved inwardly by the hand-wheel 65 until the dial gauge 70 reads zero. At the same time, the end portion 32, and hence the gear 27, is rotated about its own axis until the stylus 63 is mounted within a tooth space of the gear 27 and is clear of the teeth thereof. The gear 27 is then further rotated about its own axis until the left-hand profile is in contact with the stylus 63 and is further rotated until the dial gauge 73 reads zero. The spindle 26, and hence the gear 27, is now locked with respect to the cylinder block 15 by tightening up the nut 34.

The plunger 47 is now withdrawn from the V-shaped notch 45 and the cylinder block 15 is rotated clockwise until the mark 43 is brought into alignment with the pointer 56. The pen 77 is then lowered onto the chart 80 and the cylinder block 15 is rotated anti-clockwise from the position in which the mark 43 is in alignment with the pointer 56 to the position in which the mark 42 is in alignment therewith. During this time, the drum 78 will be rotated and, as explained above, the line drawn thereon by the pen 77 should be a straight line if the profile is perfect.

If the profile of the gear tooth 28 being tested is the right-hand profile, the stylus 63 is set-up afresh using the setting gauge 94, the stylus 63 being brought into engagement with the right-hand flank 97 as shown in FIGURE 4. The procedure is exactly the same as that given above, except that in the initial setting up of the stylus 63 the plunger 47 is moved into the V-shaped notch 44 as opposed to the V-shaped notch 45, and after the stylus 63 has been set up, the cylinder block 15 is rotated anti-clockwise, until the mark 40 is brought into alignment with the pointer 55, and is thereafter rotated clockwise until the mark 41 is in alignment with the pointer 55.

When the apparatus is used for checking the profile of a male tooth, e.g. of a pinion, the stylus 63 is initially set up by using a pin type setting gauge 100 as shown in FIGURE 5, the gauge 100 being initially mounted in the spindle 26. The stylus 63 is then wound across the pin 100 by means of the hand-wheel 65 until the dial gauge 70 reads zero. The stylus 63 is then wound transversely of the pin 100 until the pen 77 is disposed centrally of the chart 80. The dial gauge 73 is then set to zero. When this has been done, the upper slide 61 is locked to the lower slide 62 by means of the said clamping screw (not shown). This clamping screw then remains locked throughout the rest of the testing procedure.

The stylus 63 is now withdrawn by winding back the lower slide 62 by means of the hand-wheel 65. It may be necessary to exercise care to prevent the stylus 63 from hammering back onto its stops, and a light finger pressure on the side of the stylus to act against the pressure of its spring should be exerted. The setting gauge 100 can now be removed and be replaced by a gear to be tested.

This gear is placed in position in the spindle 26, the nut 34 being slack at this time to permit rotation of the gear.

If the stylus 63 has been set up for testing the left-hand profile gear, the cylinder block 15 is rotated until the V-shaped notch 44 is brought into alignment with the plunger 47 which is then wound into it. The stylus 63 is then moved inwardly towards the gear by the use of the hand-wheel 65 until the dial gauge 70 reads zero, the gear being at the same time rotated about its axis until the stylus 63 is freely mounted in a tooth space. The gear 27 is then further rotated about its own axis until the left-hand profile is in contact with the stylus 63 and rotated yet further until the dial gauge 73 reads zero. The gear is now locked by screwing up the nut 34.

The plunger 47 is now withdrawn from the V-shaped notch 44, and the cylinder block 15 is rotated until the mark 41 is aligned with the pointer 55. The pen 77 is now lowered onto the chart 80 and the cylinder block 15, and hence the chart 80, are rotated in an anti-clockwise direction until the mark 40 is brought into alignment with the pointer 55.

If the profile being tested is the right-hand profile, the stylus 63 will need to be set up again and brought into engagement with the right-hand flank 101 of the pin 100, as shown in FIGURE 5. The operation will be closely similar to that employed in testing the left-hand profile, except that use will be made aof the V-shaped notch 45 instead of the V-shaped notch 44, and the cylinder block 15 is ultimately rotated between the position in which the mark 42 is in alignment with the pointer 56 to the position in which the mark 43 is in such alignment.

We claim:
1. Apparatus for testing the profiles of gear teeth comprising feeler support means, a feeler carried thereby, gear support means for mounting a gear to be tested in a position in which a tooth profile thereof may be engaged by the feeler, the gear support means comprising a rotary member with mounting means therein for mounting the gear eccentrically in the rotary member, means for rotating the rotary member to cause the feeler to traverse a predetermined path over the said tooth profile, means for urging the feeler into contact with the said tooth profile during the said traverse, and means for indicating movement of the feeler during the said traverse.

2. Apparatus as claimed in claim 1 comprising means for indicating the angular position of the rotary member.

3. Apparatus as claimed in claim 1 in which there are means for locking the rotary member in at least one predetermined angular position.

4. Apparatus as claimed in claim 1 in which the mounting means is formed to permit rotation therein of a carrier for the gear, clamping means being provided for clamping the carrier in the mounting means.

5. Apparatus as claimed in claim 1 in which means are provided for moving the feeler support means to move the feeler towards and away from a tooth of a gear carried by the gear support means, indicator means being provided to indicate the position of the feeler support means.

6. Apparatus as claimed in claim 5 in which the feeler support means comprises a compound slide including a top slide and a bottom slide where the top slide carries the feeler, the said indicator means indicating the respective positions of the top and bottom slides of the compound slide.

7. Apparatus as claimed in claim 6 in which the indicator means comprise dial gauges carried by the compound slide and having fingers engageable with fixed abutments.

8. Apparatus as claimed in claim 6 in which the said means for indicating movement of the feeler during the said traverse comprises a pen recorder whose pen is connected to the feeler for movement therewith.

9. Apparatus as claimed in claim 8 in which the pen recorder comprises a rotatable drum which is connected to the top slide for movement therewith.

10. Apparatus as claimed in claim 9 in which common means are provided for effecting simultaneous rotation of the rotary member and of the rotatable drum.

References Cited

UNITED STATES PATENTS

| | | | |
|---|---|---|---|
| 3,321,840 | 5/1967 | Pedersen | 33—179.55 |
| 3,233,331 | 2/1966 | Bassoff | 33—179.55 |
| 2,724,902 | 11/1955 | Davies | 33—179.5 |
| 2,563,000 | 8/1951 | Bean | 33—179.5 |

LEONARD FORMAN, Primary Examiner

ROGER A. FIELDS, Assistant Examiner